Dec. 15, 1925.
H. E. MARTIN
SCREEN DOOR FLYTRAP
Filed Feb. 11, 1924
1,566,032
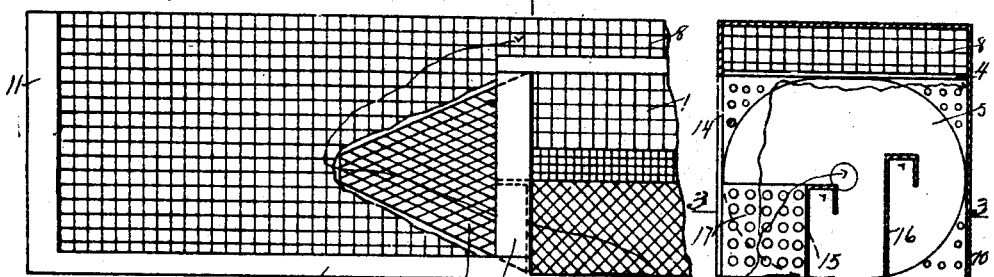
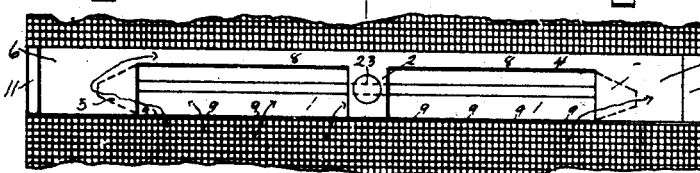
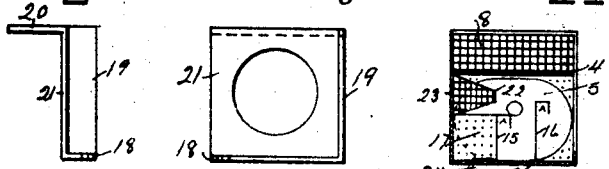 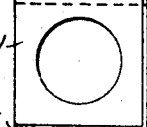 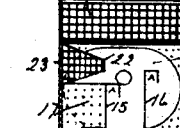
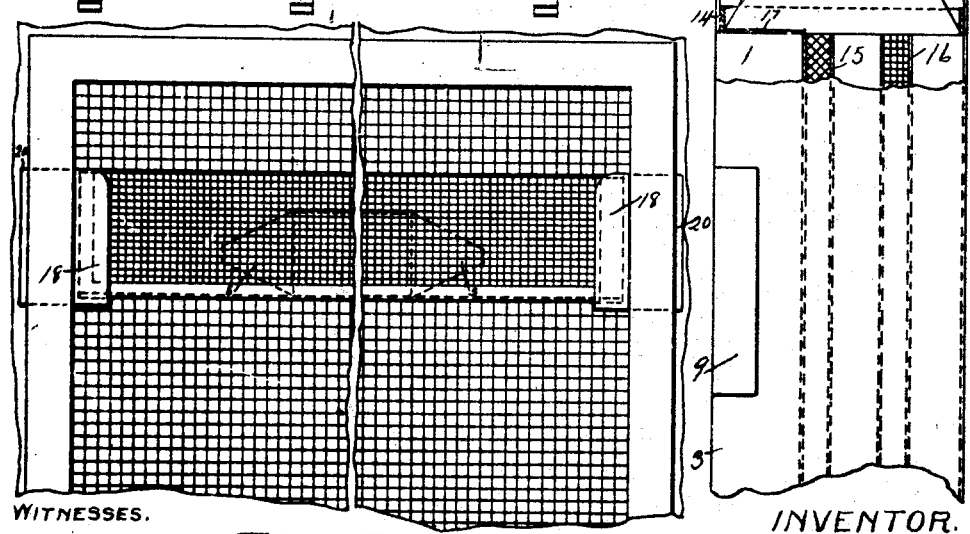
WITNESSES.
*Jacob A. Newman*
INVENTOR.
HUGH. E. MARTIN.
BY *Charles Albert French.*
ATTORNEY.

Patented Dec. 15, 1925.

1,566,032

UNITED STATES PATENT OFFICE.

HUGH E. MARTIN, OF MADISON, WISCONSIN.

SCREEN-DOOR FLYTRAP.

Application filed February 11, 1924. Serial No. 692,175.

*To all whom it may concern:*

Be it known that I, HUGH E. MARTIN, a citizen of the United States, residing at Madison, in the county of Dane and State of Wisconsin, have invented certain new and useful Improvements in Screen-Door Flytraps, of which the following is a specification.

My invention relates to fly traps adapted to be secured to the outside of screen doors with the screen on the door forming the back of the central portion of the trap; and the objects of my invention are, first, to so construct a trap extending across the door a distance down from the top that the flies crawling upward on the outside of the screen will pass into the trap before meeting any obstruction to turn their course; second, to have the obstruction in the form of a ceiling, so as to compel a change of direction towards the ends of the trap, and guide the flies into and through conical walls leading into end compartments which are connected over the ceiling and covered by a roof, forming a gallery from one end of the trap to the other; third, to have one end compartment closed at the outer end, and the other provided with a cap or door adapted to be removed or opened when desired to remove dead flies or clean the trap; fourth, to provide a conical entrance from the inside of the screen door to the trap so that flies may enter from that side also.

I attain these objects by the mechanism shown in the accompanying drawing in which—

Fig. 1, is rear elevation, a distance from both ends;

Fig. 2, is a transverse vertical section on line 2—2 of Fig. 1 looking from the center towards the end of the trap;

Fig. 3, is an inverted plan partly in section on line 3—3 Fig. 2;

Fig. 4, is an inside elevation on a reduced scale, showing by arrows how flies pass into the trap and are guided by the ceiling into the gallery;

Fig. 5, is a front elevation of the trap attached to a door (partly broken away) by special brackets;

Fig. 6, is a plan of the special bracket;

Fig. 7, is a right side elevation of same;

Fig. 8, is a transverse vertical section through the trap at the center on line 8—8 of Fig. 4.

Figs. 5, 6, 7 and 8 are on a reduced scale.

Similar numerals refer to similar parts throughout the several views.

The trap is externally covered with wire screen excepting the bottom plate, which is of sheet metal and a large portion of the side next to the screen door, which is designated compartment 1, and extends approximately one third the length of the trap both sides of the center strip 2 and from the bottom plate 3 to the ceiling wall 4, and is partly closed at both ends by truncated cones 5 of wire screen which divide said compartment from the end compartments 6 and 7 at the two ends, and the compartments 6 and 7 are open to a gallery 8 extending from end to end between the ceiling wall 4 and the top of the trap. The bottom plate 3 is constructed of sheet metal, with portions removed from the rear edge forming passageways 9 through which the flies will pass when crawling upward on the outside of the screen door, the front edge of the plate is turned upward at 10 the entire length, and the rear edge along the compartments 6 and 7 for making the bottom more rigid and soldering the outer casing of screen thereto. A metal band 11 is secured to one end of plate 3 and passes up the sides and over the top of the trap for securing the screen end thereto, and a similar but wider band 12 is disposed at the other end forming the frame for door 13 through which dead flies may be removed. The cones 5 are soldered to bands 14 for support and to the bottom plate 3 and form the end partition walls to the compartment 1 and also passageways from 1 to the end compartments 6 and 7. A wire screen roofed partition 15 a distance forward of the passageways 9 is soldered to the bottom plate and extends from end to end of the compartment 1, and a similar but higher one 16 is soldered to the plate midway from 15 to the front of the trap.

Walls 17 at the ends of partition 15 prevent flies from passing backward to the passageways 9 when once within the entrance to the cones 5. The trap complete is a rectangular cross section elongated screen wire tube, with closed ends and partly open side next to the screen door, and is secured to the door by special brackets 18 which are constructed of sheet metal with a front flange 18, a bottom flange 19, an attaching plate 20 and end wall 21 with the center removed, these brackets are attached to the outside of a screen door by forcing the attaching plate 20 under the molding and next to the screen on the door, with the flange 19 at the bottom, and being made right and left to form in conjunction with the door, pockets adapted to receive and hold securely the ends of the trap, see Fig. 5. To secure the trap to a screen door, attach the brackets as above described and dispose the trap in the brackets with the bottom plate 3 resting on the flanges 19 and the open side of the trap next to the screen on the door, which will also bring the cone 22 secured to the center strip 2 into contact with the screen, which should be provided with a hole registering with the opening 23 in the said strip, thereby providing an entrance to the trap from the inside of the door. The operation of the trap is as follows; flies as can be observed usually travel upward on a door or window, and with this trap installed as above explained, it will intercept their travel before they reach the top of the door, but through the entrances 9 in the bottom plate will not be stopped until they have entered the compartment 1 of the trap and are stopped by the ceiling wall 4, then they will travel to the front of the trap towards the light, see zigzag line Fig. 2, and in traveling either to the right or left they will arrive at the entrance to the cones 5, and should they go downward to the bottom plate 3 they will be prevented escape through the entrances 9 by the screen covered partitions 15 and 16 and again be guided along the same to the entrance to the cones 5. After passing through the cones are in one of the end compartments 6 or 7 and will exhaust their lives traveling from one to the other through the gallery 8, the mark thus A represents flies in different localities.

To remove dead flies from the trap; lift the trap upward out of the brackets 18 and hold it with the bottom plate 3 on top and lower the end with the door 13 towards the ground, when all dead flies will by a little jar of the trap slide downward to the door through which they may be removed. A lure of saccharine matter may be placed on top of and along the bottom plate 3 between partition 15 and the entrances 9 as at 24.

Having thus described my invention, I claim:

In a flytrap removably located in brackets which are secured to the outside of a screen door by a portion of the brackets being forced between the screen and the binding molding of the door, the combination with the screen of the door of a metal bottom plate with portions removed from the edge abutting the door screen, rectangular frames secured to the ends of the bottom plate with light admitting closures for the frames, truncated tapering partitions located a distance inward from the ends and extending from the plate upward to a wire screen ceiling the width of the bottom plate, and extending from one tapered partition to the other, covered partitions secured longitudinally of the bottom plate terminating at the tapered partitions, a central strip of metal extending from the bottom plate to the ceiling wall, with an opening in same through which flies may pass from the inside of the door to the inside of the trap, wire screen covering the front, top, and back of the trap, excepting that portion of the back between the bottom plate, screen ceiling, and the tapered partitions.

In testimony whereof I affix my signature.

HUGH E. MARTIN.